United States Patent
Dadkhah Tehrani et al.

(10) Patent No.: US 12,524,021 B2
(45) Date of Patent: Jan. 13, 2026

(54) FAULT TOLERANT MOTION PLANNER

(71) Applicant: LOCKHEED MARTIN CORPORATION, Bethesda, MD (US)

(72) Inventors: Navid Dadkhah Tehrani, Providence, RI (US); Christopher A. Thornberg, Newtown, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 170 days.

(21) Appl. No.: 17/406,413

(22) Filed: Aug. 19, 2021

(65) Prior Publication Data

US 2023/0059421 A1   Feb. 23, 2023

(51) Int. Cl.
| | |
|---|---|
| *G05D 1/46* | (2024.01) |
| *B64D 45/00* | (2006.01) |
| *G05D 1/80* | (2024.01) |
| *G05D 1/85* | (2024.01) |
| *G07C 5/08* | (2006.01) |

(52) U.S. Cl.
CPC ............. *G05D 1/46* (2024.01); *G05D 1/80* (2024.01); *G07C 5/0816* (2013.01); *B64D 2045/0085* (2013.01); *G05D 1/854* (2024.01); *G05D 1/857* (2024.01)

(58) Field of Classification Search
CPC ........ G05D 1/00; G05D 1/101; G05D 1/0055; G05D 1/0072; G05D 1/042; G05D 1/08; G05D 1/0816; G05D 1/0833; G05D 1/48; G05D 1/49; G05D 1/60; G05D 1/617; G05D 1/622; G05D 1/6545; G05D 1/80; G05D 1/85; G05D 1/86; G07C 5/08; G07C 5/0816; G07C 5/00; B64D 45/00; B64D 2045/0085; B64D 45/04; B64D 45/0005
See application file for complete search history.

(56) References Cited

U.S. PATENT DOCUMENTS

| | | | |
|---|---|---|---|
| 8,355,830 B2 | 1/2013 | Kordonowy | |
| 9,257,048 B1 * | 2/2016 | Offer | .......... G08G 5/02 |
| 9,448,558 B2 * | 9/2016 | Litwinowicz | .......... B64D 45/00 |
| 10,242,580 B2 * | 3/2019 | Groden | .......... B64C 13/16 |
| 11,156,461 B1 * | 10/2021 | McCusker | .......... G01C 23/00 |

(Continued)

FOREIGN PATENT DOCUMENTS

EP           3998594 A1 *  5/2022  ............. B64D 43/00

*Primary Examiner* — Christian Chace
*Assistant Examiner* — Nicholas Stryker
(74) *Attorney, Agent, or Firm* — Foley & Lardner LLP

(57) ABSTRACT

This disclosure relates to apparatuses, systems, and methods for handling faults on vehicles. One or more processors in a vehicle may receive, from a control unit in response to a detection of a fault in the vehicle, an indication of a degradation in a performance constraint of the vehicle. The processors may determine, responsive to the degradation in the performance constraint, that the vehicle is unable to execute a set of commands to control a movement of the vehicle along a trajectory. The processors may generate, in accordance with the degradation in the performance constraint, a modified set of commands that the vehicle is able to execute to control the movement of the vehicle along at least a portion of one or more trajectories. The processors may provide the modified set of commands to the control unit of the vehicle to control the movement of the vehicle.

17 Claims, 6 Drawing Sheets

(56) References Cited

U.S. PATENT DOCUMENTS

| | | | |
|---|---|---|---|
| 2009/0171560 A1* | 7/2009 | McFerran | G08G 5/025 701/533 |
| 2010/0017049 A1* | 1/2010 | Swearingen | G07C 5/0816 701/31.4 |
| 2010/0292873 A1* | 11/2010 | Duggan | G08G 5/80 701/11 |
| 2013/0179059 A1* | 7/2013 | Otto | G06Q 50/40 701/120 |
| 2015/0153740 A1* | 6/2015 | Ben-Shachar | G05D 1/0072 701/16 |
| 2017/0269611 A1* | 9/2017 | Rangarajan | B64C 39/024 |
| 2017/0285631 A1* | 10/2017 | Bethke | G05D 1/222 |
| 2018/0052472 A1* | 2/2018 | Cherepinsky | G08G 5/0086 |
| 2018/0196435 A1* | 7/2018 | Kunzi | G08G 5/55 |
| 2019/0041233 A1* | 2/2019 | Duerksen | G08G 5/0034 |
| 2020/0103897 A1 | 4/2020 | Thornberg et al. | |
| 2020/0257314 A1* | 8/2020 | Kimchi | G06V 20/13 |
| 2020/0355519 A1* | 11/2020 | Shamasundar | G08G 5/025 |
| 2021/0287558 A1* | 9/2021 | Schulze | B64D 45/00 |
| 2024/0053770 A1* | 2/2024 | Patel | G05D 1/82 |

\* cited by examiner

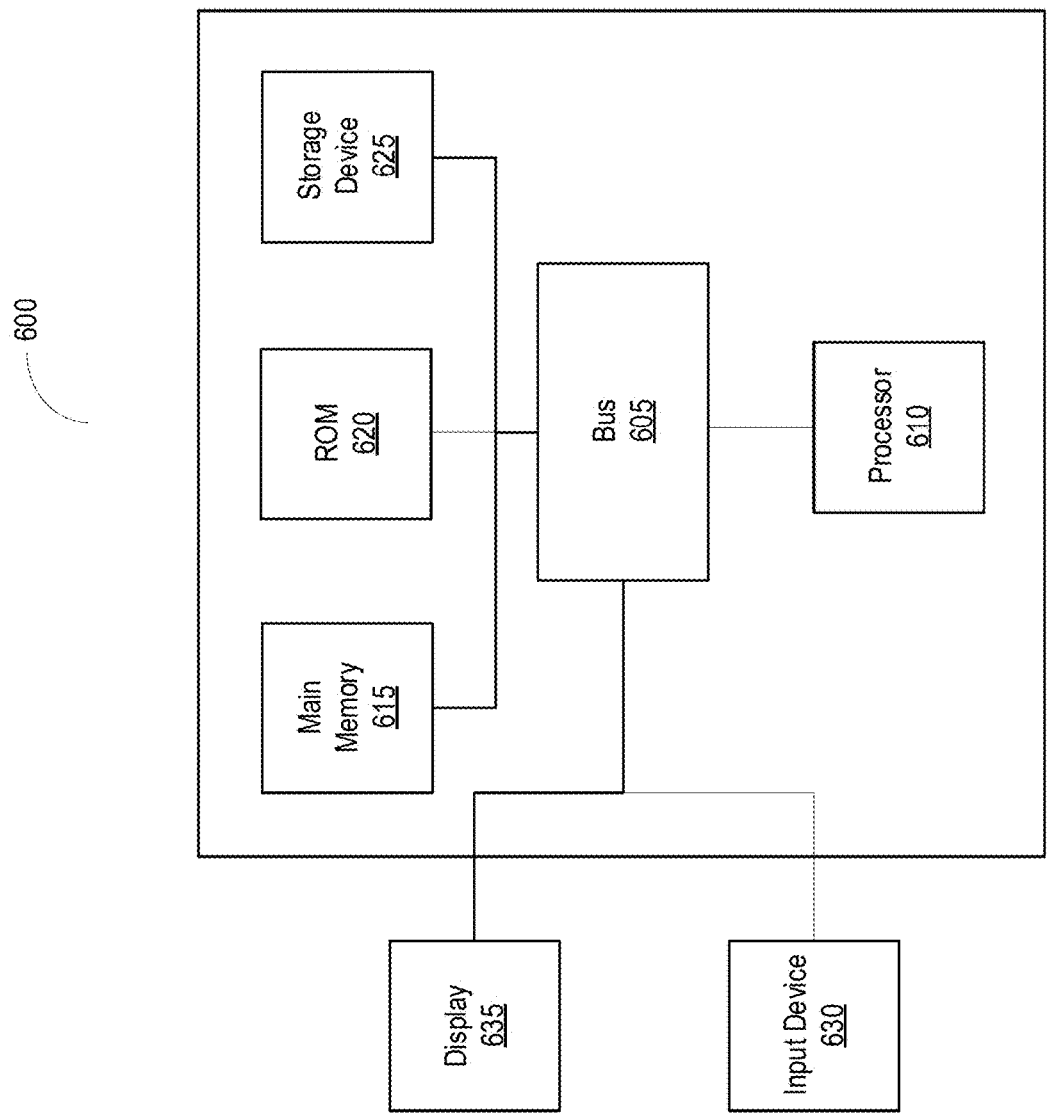

FAULT TOLERANT MOTION PLANNER

TECHNICAL FIELD

The present disclosure relates to fault tolerant motion planners, and more generally, motion planning systems.

BACKGROUND

As a vehicle navigates through an environment along a path from an initial point to a terminal point, various components in the vehicle may experience faults. Due to such faults, the vehicle may be unable to conform to the originally planned path.

SUMMARY

A vehicle may include a motion planner to generate flight trajectories and a control system to carry out the flight trajectories in accordance with fly-by-wire techniques to navigate the vehicle from a start point to a destination point along a flight path. In carrying out the flight through the environment, the control system may set command parameters to convey to various components in sensor and propulsion systems. When faults occur in any of these components, the control system can internally reconfigure the distribution of control effectors in an attempt to overcome the fault to maintain the vehicle along the flight path. Although the fault-tolerant control system can address minor deviations from the path due to such faults, one issue may be that the control system may be unable to fully recover the maneuverability of the vehicle. The overall system performance and vehicle maneuverability may be compromised through the remainder of the flight path.

Another issue with redistribution of the control effectors may be that the degradation of performance and maneuverability is not communicated by the control system to the motion planner. As a result, there may be a discrepancy between the motion planner and the control system as to the capabilities of the vehicle, with certain flight trajectories generated by the mission planner that may be no longer be achievable due to the degradation in performance. One approach to address these problems may be to manually reconfigure the motion planner to account for the faults. But the manual reconfiguration may be inaccurate or improper, and may not account for all the degradation in vehicle performance and maneuverability.

To address these and other technical challenges, the fault-tolerant fly-by-wire control system and the motion planner may coordinate operations when a fault is detected on the vehicle. In response to a detection of the fault, a command model of the control system may identify a degradation to a capability of the vehicle related to performance or maneuverability. For instance, the control system can detect a failure to a hydraulic actuator in the propulsion system of the vehicle. Using a table that maps various types of failures to corresponding changes in performance, the control system can determine the decrease in the maneuverability of the vehicle as a result of the detected failure. Once determined, the control system can provide an indication of the capability degradation of the vehicle to the motion planner. The indication may include, for example, the new maximum roll rate and maximum vertical speed due to the fault.

Using the degraded capabilities of the vehicle due to the detected fault, the motion planner can adjust or modify a trajectory model for the vehicle. The modified trajectory model can specify a refined envelope of possible trajectories that can be carried out by the vehicle in view of the degradation in the capabilities due to the fault. With the modification, the motion planner can generate new trajectories that fall within the refined envelope and feedback the new trajectories to the control system. The control system can in turn apply command parameters to the components in the vehicle to effectuate one of the flight trajectories for the vehicle. As a result, the baseline performance of the vehicle and the possible trajectories generated by the motion planner can conform to the confined area of commands due to the fault. In certain circumstances, depending on the type of fault, the motion planner can determine that the vehicle can no longer reach the originally planned destination point due to the degradation. Based on this determination, the motion planner can provide an indication to a mission planner to automatically plot out a flight path to a safe landing zone.

In this manner, since the motion planner receives indications of degraded capabilities from the control system, there may be no longer a discrepancy between the motion planner and the control system regarding the decrease in performance and maneuverability. In addition, with the provision of the indicated capabilities, manual reconfiguration of the motion planner may be reduced, if not eliminated. Furthermore, the updated trajectories generated by the motion planner can take into account the updated performance and maneuverability constraints of the vehicle. Using the updated trajectories, the control system can redirect the vehicle to carry out the original or a new flight path, despite the faults in the various components of the sensor and propulsion system of the vehicle.

At least one aspect of this technical solution is directed to apparatuses, systems, and methods for handling faults on vehicles. One or more processors coupled with memory may be housed in a vehicle. The one or more processors may receive, from a control unit in response to a detection of a fault in the vehicle, an indication of a degradation in a performance constraint of the vehicle. The one or more processors may determine, responsive to the degradation in the performance constraint, that the vehicle is unable to execute a set of commands to control movement of the vehicle along a trajectory. The one or more processors may generate, in accordance with the degradation of the performance constraint, a modified set of commands that the vehicle is able to execute to control the movement of the vehicle along at least a portion of one or more trajectories. The one or more processors may provide the modified set of commands to the control unit of the vehicle to control the movement of the vehicle.

In some embodiments, the one or more processors may determine, responsive to the degradation in the performance constraint not satisfying a requirement defined by the trajectory, that the vehicle is unable to execute the set of commands to control the vehicle along the trajectory.

In some embodiments, the one or more processors may generate the modified set of commands to control the movement of the vehicle along a second trajectory, different from the trajectory, responsive to the degradation in the performance constraint not satisfying a requirement defined by the trajectory. In some embodiments, the one or more processors may generate the modified set of commands based on a state of the vehicle, the state including at least one of a position, an orientation, and a speed of the vehicle.

In some embodiments, the one or more processors may determine, responsive to the degradation in the performance constraint, that the vehicle is unable to reach a first destination point due to the degradation of the performance constraint. In some embodiments, the one or more processors may provide an indication that the vehicle is unable to reach the first destination point to a mission planner, the mission planner to determine a second trajectory to a second destination point based on environment data, the environment data identifying at least one of an obstacle or a terrain in an environment in which the vehicle is navigating.

In some embodiments, the one or more processors may select, from at least the portion of the one or more trajectories, a second trajectory based on the degradation in the performance constraint. In some embodiments, the one or more processors may determine a plurality of commands capable to be performed on the vehicle based on the degradation in the performance constraint.

In some embodiments, the one or more processors may provide, for presentation, a prompt to select the second trajectory along which to navigate the vehicle. In some embodiments, the update to the performance constraint includes at least one of a minimum roll rate, maximum roll rate, a roll bandwidth, a minimum pitch rate, a maximum pitch rate, a pitch bandwidth, a maximum yaw rate, a yaw bandwidth, a maximum vertical speed, a maximum roll acceleration, a maximum pitch acceleration, and a vertical speed bandwidth. In some embodiments, the control unit may identify, using the fault detected on the vehicle, the update to the performance constraint.

BRIEF DESCRIPTION OF THE DRAWINGS

FIG. 6 illustrates a block diagram of an example computer system useful in implementing one or more components detailed herein.

DETAILED DESCRIPTION

Figure 1:
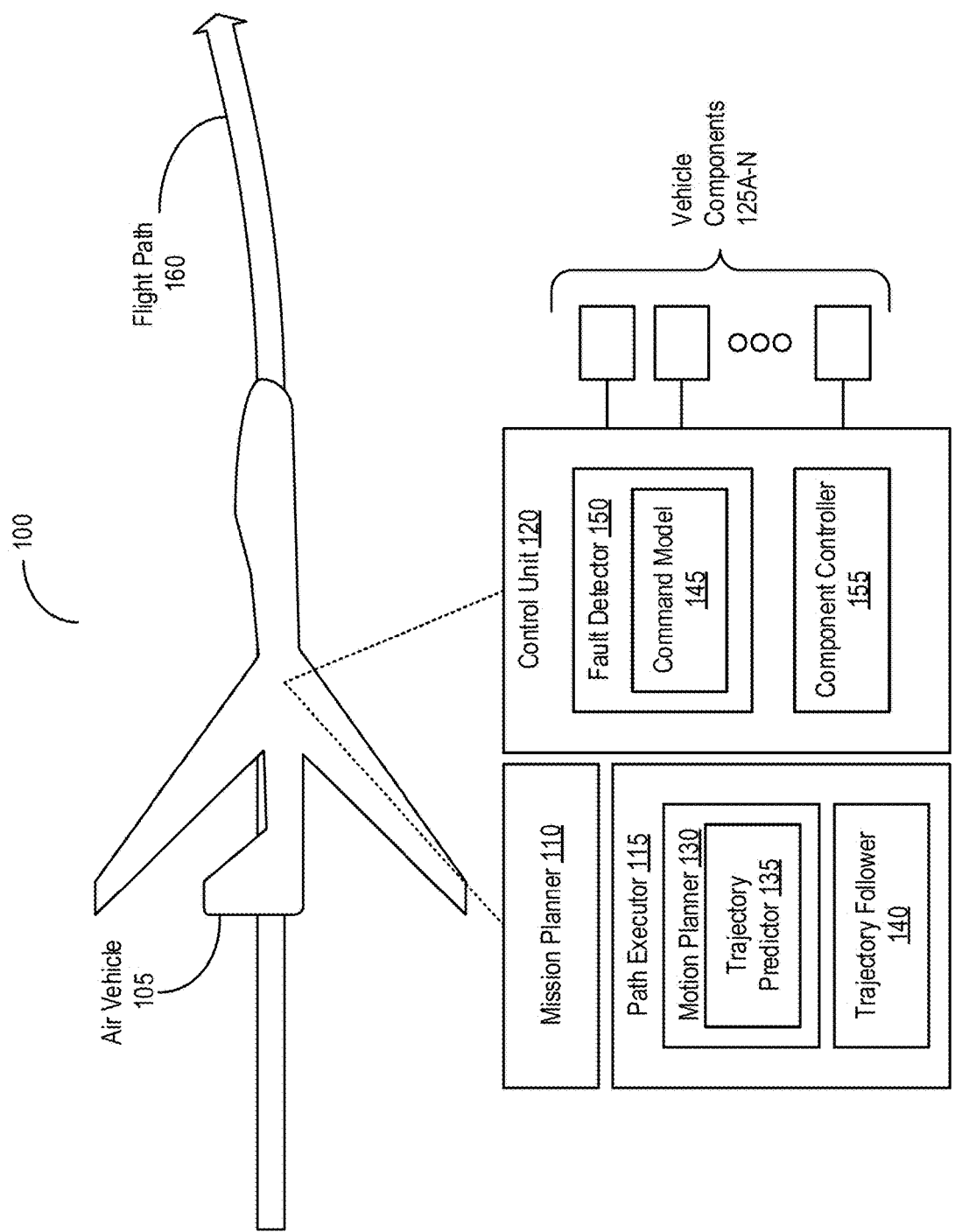
FIG. 1 illustrates a block diagram of a system for handling faults on vehicles, in accordance with an illustrative embodiment.

In the following detailed description, reference is made to the accompanying drawings, which form a part hereof. In the drawings, similar symbols typically identify similar components, unless context indicates otherwise.

A vehicle may include a motion planner to generate flight trajectories and a control system to carry out the flight trajectories in accordance with fly-by-wire techniques to navigate the vehicle from a start point to a destination point along a flight path. In carrying out the flight through the environment, the control system may set command parameters to convey to various components in sensor and propulsion systems. When faults occur in any of these components, the control system can internally reconfigure the distribution of control effectors in an attempt to overcome the fault to maintain the vehicle along the flight path. Although the fault-tolerant control system can address minor deviations from the path due to such faults, the overall system performance and vehicle maneuverability may be compromised for the remainder of the flight path. Another issue with redistribution of the control effectors may be that the degradation of performance and maneuverability is not communicated by the control system to the motion planner.

To address these and other technical challenges, the fault-tolerant fly-by-wire control system and the motion planner may coordinate operations when a fault is detected on the vehicle. In response to a detection of the fault, a command model of the control system may provide a degradation to a capability of the vehicle related to performance or maneuverability to the motion planner. Using the degraded capabilities of the vehicle due to the detected fault, the motion planner can adjust or modify a trajectory model for the vehicle. The modified trajectory model can specify a refined envelope of possible trajectories that can be carried out by the vehicle in view of the degradation in the capabilities due to the fault. The motion planner may feedback the new trajectories to the control system. The control system can in turn apply command parameters to the components in the vehicle to effectuate one of the flight trajectories for the vehicle.

By communicating indications of degraded capabilities from the control system, there may be no longer a discrepancy between the motion planner and the control system regarding the decrease in performance and maneuverability. The updated trajectories generated by the motion planner can take into account the updated performance and maneuverability constraints of the vehicle. Using the updated trajectories, the control system can redirect the vehicle to carry out the original or a new flight path, despite the faults in the various components of the sensor and propulsion system of the vehicle.

Referring to FIG. 1, depicted is a block diagram of an environment or a system 100 for handling faults on vehicles. In overview, the system 100 may include at least one air vehicle 105. The air vehicle 105 may include at least one mission planner 110, path executor 115, at least one control unit 120 (sometimes referred herein as a control system), and one or more vehicle components 125A-N (hereinafter generally referred to as vehicle components 125), among others. The path executor 115 may include at least one motion planner 130, at least one trajectory predictor 135, and at least one trajectory follower 140, among others. The motion planner 130 may include the trajectory predictor 135, among others. The control unit 120 may include at least one command model 145, at least one fault detector 150, and at least one component controller 155 (sometimes referred herein as a low-level control system), among others. Various components and modules of the system 100, such as the mission planner 110, the path executor 115, and the control unit 120, among others, may be implemented using hardware components or a combination of software and hardware components as detailed herein in FIG. 6.

In further detail, the air vehicle 105 can include any transport capable of navigating through an environment. The air vehicle 105 can be any type of aircraft, such as a fixed-wing aircraft (e.g., with a propeller or jet engine), a rotorcraft (e.g., a helicopter, an autogyro, or a gyrodrone), an aerostat (e.g., an airship or dirigible), or an underwater vehicle (e.g., a submarine, a submersible, or an underwater glider, among others). The air vehicle 105 can be manned or unmanned, or any combination thereof. If manned, the navigation of the air vehicle 105 can be controlled by an onboard pilot from the cockpit therein. If unmanned, the navigation of the air vehicle 105 can be autonomous with no input or remote input (e.g., from a remote terminal) while traveling through the environment. While discussed primarily in terms of an air vehicle, land-bound vehicles (e.g., a sedan car, a truck, a van, or a bus) and seaborne vehicles (e.g., a ship, a frigate, or a hydrofoil ship) may be also applicable.

The components 125 may correspond to any part of the air vehicle 105. For example, the components 125 may include those for the overall structure of the air vehicle 105, such as hull, fuselage, cockpit, windows, tail boom, and masts, among others. The components 125 may include those for propulsion to navigate through the environment, such as a landing gear, fuel tank, batteries, engine, rotor (including main rotor and tail rotor), wing (including slat, flat, spoiler, and aileron), and tail (including stabilizers, elevator, and rudder), among others. The components 125 may include those for instrumentation to measure or acquire various characteristics about the functions of the air vehicle 105, such as the navigation (e.g., geographic location, altitude, airspeed, vertical speed, direction, heading, or turn) and operational status (e.g., critical, failed, or normal), usage (e.g., on or off), or other metrics (e.g., fuel level or temperature), among others.

The mission planner 110 can determine or generate at least one flight path 160 along which the air vehicle 105 is to navigate through the environment. In some embodiments, the motion planner 110 can retrieve, receive, or otherwise identify the flight path 160 for the air vehicle 105. The flight path 160 may maintain and store on a data storage of the air vehicle 105 using at least one data structure, such as a table, an array, a matrix, a linked list, a tree, a graph, and a heap, among others. The flight path 160 may identify an initial point, a terminal point, and one or more waypoints between the initial point and the terminal point, among others. Each of the points may be defined, for example, in terms of geographic coordinates (e.g., longitudes and latitudes), angle, and altitude, among others. The flight path 160, including the initial, terminal, and waypoints, may be defined or configured by an operator or a service of the air vehicle 105 prior to the navigation through the environment.

To effectuate the flight path 160, the motion planner 130 of the path executor 115 may retrieve, receive, or otherwise identify environmental data about the environment or terrain through which the air vehicle 105 is navigating. The environmental data may be received from the instrumentation or sensors in one or more components 125 of the air vehicle 105. The sensors may include, for example, a camera to acquire an image of the surroundings of the air vehicle 105, a LIDAR (light detection and ranging) unit to image the surroundings using a laser, or a RADAR (radio detection and ranging) unit to detect electromagnetic (e.g., radio) waves, among others. The environmental data may include various characteristics about the environment, such as whether it is populated or unpopulated, contains obstacles (e.g., other aircraft, buildings, or mountainous), is level or flat, includes a body of water (e.g., rivers, lake, sea, or ocean), and climate (e.g., temperate, jungle, or desert), among others. In some embodiments, the motion planner 130 may use a world model maintained by the path executor 115 to determine a geographic location of the air vehicle 105 within the environment. The world model may define or identify an environment or terrain through which the air vehicle 105 is to navigate, and points of the flight path 160 may be defined relative to the world model.

The trajectory predictor 135 of the path executor 115 may be a dynamic system to model the behavior of the air vehicle 105 with the component controller 155. The trajectory predictor 135 may incorporate or emulate the functionality of other components of the air vehicle 105. In some embodiments, the trajectory predictor 135 may include the model of the air vehicle 105, the component controller 155, the command model 145, and the trajectory follower 140. In some embodiments, the trajectory predictor 135 may be a reduced order representation of the model of the air vehicle 105, the component controller 155, the command model 145, and the trajectory follower 140.

In accordance with the flight path 160 and the environment data, the trajectory predictor 135 of the path executor 115 may determine or generate one or more trajectories along which to navigate the air vehicle 105. Each trajectory may correspond to a route between the initial and terminal points through each of the consecutive waypoints of the flight path 160. The trajectories may be defined in terms of a velocity, an angle, or range, among parameters, along a pitch axis, a roll axis, or a yaw axis relative to the air vehicle 105. In some embodiments, the trajectory predictor 135 may also use the world model to determine or generate the trajectories. The trajectories generated by the trajectory predictor 135 may be defined relative to the world model, and may be in terms of geographic coordinates (e.g., longitudes and latitudes) and altitude, among others relative to the terrain. The number of trajectories generated by the trajectory predictor 135 may range from 1 to 100,000. In some embodiments, the trajectory predictor 135 may identify or determine a requirement for the air vehicle 105 to navigate along each trajectory. Each trajectory may entail that the air vehicle 105 is to satisfy certain performance constraints. The requirement for the trajectory may identify, specify, or otherwise define a set of performance constraints for the air vehicle 105, such as a minimum rate and bandwidth along a pitch axis, roll axis, or a yaw axis relative to the air vehicle 105, as well as a minimum speed and bandwidth along a roll axis, pitch axis, or a vertical axis of the air vehicle 105 through the environment.

From the trajectories, the motion planner 130 may identify or select at least one trajectory to navigate the air vehicle 105. The selection may be to fly an obstacle-free, dynamically feasible route through the environment. In some embodiments, the motion planner 130 may use a sampling algorithm to build a data structure for predicted trajectories. For example, the sampling algorithm may be stochastic, such as a rapidly exploring random (RRT) tree, a randomized binary search tree, or a random binary tree, among others. The motion planner 130 may identify or select at least one of the trajectories based on the environmental data and other factors. For example, the motion planner 130 may identify the best trajectory in terms of dynamic feasibility, clearance to obstacles, and overall length and time, among others. In some embodiments, the motion planner 130 may use a model predictive control (MPC) protocol to select the trajectory. The MPC control may define an optimization procedure with which to calculate the best trajectory.

Based on the trajectories, the trajectory predictor 135 may determine, derive, or generate a set of commands (sometimes herein referred to as signals) to control movement of the air vehicle 105. In some embodiments, the trajectory predictor 135 may generate the set of commands for the selected trajectory. The set of commands may specify, define, or otherwise identify values to apply to the propulsion system in one or more components 125 in the air vehicle 105 to navigate along the trajectory. For example, the set of commands may specify the amount of thrust each engine of the air vehicle 105 is to output and the amount of fuel to be provided to the engines. In some embodiments, the trajectory predictor 135 may generate the set of commands in accordance with a table of commands. The table of commands may be maintained using at least one data structure, such as a table, an array, a matrix, a linked list, a tree, a graph, and a heap, among others. The table of commands may correspond a parameter of the trajectory (e.g., velocity and angle along axes) to a corresponding set of commands.

Upon generation, the motion planner 130 may send or provide the selected trajectory to the trajectory follower 140. The selected trajectory may include information to navigate the air vehicle 105. The information may correspond to the requirement for the air vehicle 105 to execute the trajectory. For example, the information may identify each point of the trajectory, in terms of a latitude, longitude, altitude, and speed, among others. In some embodiments, the information may further include the pitch, roll, pitch rate, and roll rate, acceleration, among others. In some embodiments, the trajectory predictor 135 may provide the set of commands to the trajectory follower 140.

The trajectory follower 140 of the path executor 115 may retrieve, identify, or otherwise receive the selected trajectory from the motion planner. With receipt, the trajectory follower 140 may identify the information for navigating the air vehicle 105, such as a set of waypoints as well as a latitude, longitude, altitude, speed, and other specifications for each waypoint. The trajectory follower 140 may compare a current state of the air vehicle 105 to the specifications of the trajectory. Based on the comparison, the trajectory follower 140 may calculate or determine an error metric. The error metric may identify a deviation of the air vehicle 105 from the specifications of the trajectory, such as a track error, an altitude error, and a cross track error, among others. Using the error metric, the trajectory follower 140 may calculate or determine a correction measure. For example, through a series of feedback control loops and functions, the trajectory follower 140 may calculate a target velocity, acceleration, altitude, orientation, or vertical speed, or any combination thereof, to navigate the air vehicle 105 along the selected trajectory. With the determination, the trajectory follower 140 may generate the set of commands (sometimes herein referred to as signals) in a similar manner as discussed above.

Upon generation, the trajectory follower 140 may send, convey, or provide the set of commands to the control unit 120. In some embodiments, the trajectory follower 140 may adjust or modify the set of commands prior to provision of the commands to the control unit 120, for example, based on the correction measure. The modification may be based on a state of the air vehicle 105, such as a position, an orientation, and a speed or velocity of the air vehicle 105. In some embodiments, the trajectory follower 140 may provide the set of commands to the command model 145 of the control unit 120. The command model 145 may retrieve, identify, or otherwise receive the set of commands from the path executor 115. In some embodiments, the command model 145 may be the first component in the control unit 120 to receive the set of commands from the path executor 115.

The component controller 155 of the control unit 120 may retrieve, identify, or otherwise receive the set of commands from the motion planner 130 of the path executor 115 via the command model 145. The trajectory and the set of commands initially generated to carry out the flight path 160 may not take into account any faults in any of the components 125 of the air vehicle 105. In some embodiments, the component controller 155 may apply the command model 145 to the set of commands to modify, adjust, or shape the incoming set of commands by applying performance constraints identified for the air vehicle 105. The command model 145 may be, for example, an n-th order low-pass filter (e.g., a Butterworth filter, a Chebyshev filter, or a Bessel filter) with given parameters, such as bandwidth, slew rate, and maximum amplitude to adjust the set of commands (or signals).

From applying, the component controller 155 may calculate or determine a deviation measure between the original set of commands and the new adjusted set of commands. The deviation measure may indicate a degree of difference between the original set of commands and the adjusted set of commands. The component controller 155 may compare the deviation measure to a threshold. The threshold may identify or define a value for the deviation measure at which to apply the adjusted set of commands or the original set of commands. If the deviation measure is greater than or equal to the threshold, the component controller 155 may select the adjusted set of commands. For example, if the desired signal has a much faster slew rate, the component controller 155 may use the adjusted commands. Otherwise, if the deviation measure is less than the threshold, the component controller 155 may use the original set of commands in controlling navigation of the air vehicle 105.

The component controller 155 may apply the set of commands to the corresponding components 125 in the air vehicle 105 to carry out the trajectory for the flight path 160. In applying, the component controller 155 may convert the set of commands to control effector commands. For example, with a fixed-wing aircraft, the component controller 155 may generate signals to control elevator, rudder, aileron, and throttle of the air vehicle 105. The generation of the control effector commands may be performed via a series of feedback control loops and functions by comparing the signal with the vehicle states as identified in the instrumentation on the air vehicle 105. In some embodiments, the component controller 155 may identify one or more of the components 125 to which to apply the set of commands. For example, when the set of commands may specify that a left elevator position is to be adjusted by a certain amount, the component controller 115 may identify a left elevator to which to apply the set of commands. Once identified, the component controller 115 may provide or apply the set of commands to the components 125.

Figure 2:
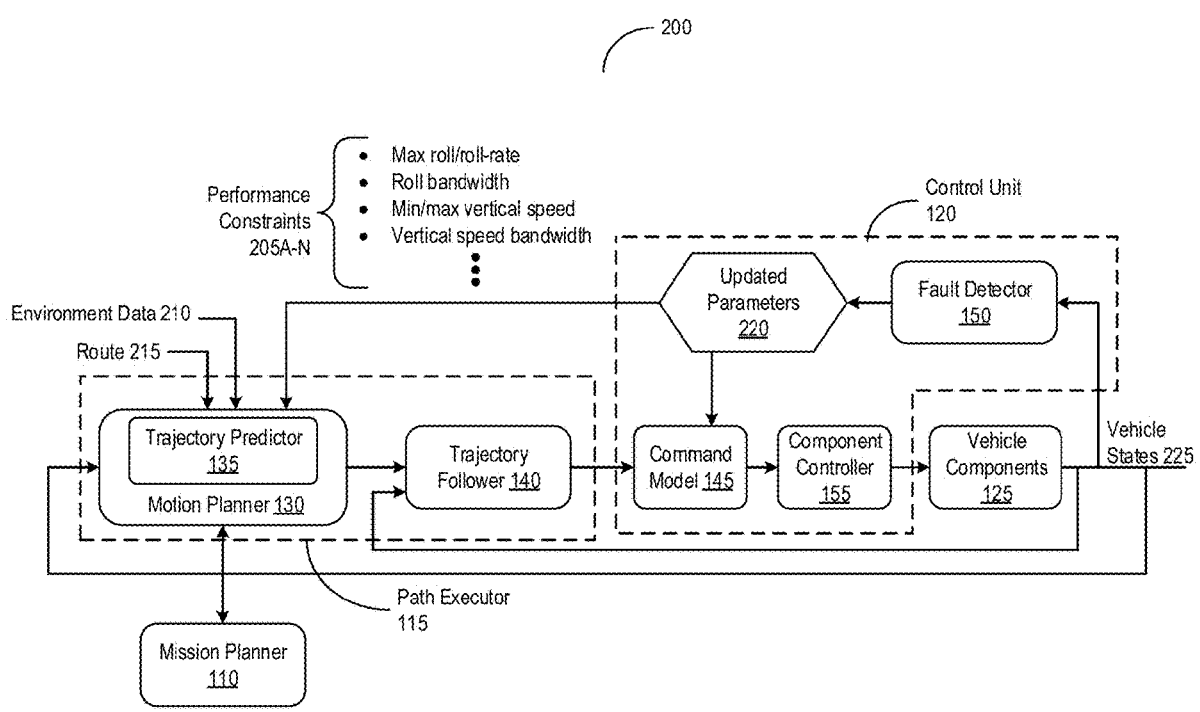
FIG. 2 illustrates a block diagram of a process for providing feedback to a motion planner in the system for handling faults on vehicles, in accordance with an illustrative embodiment.

Referring to FIG. 2, among others, depicted is a block diagram of a process 200 for providing feedback to the motion planner 130 in the system 100 for handling faults on vehicles. Under the process 200, while navigating through the environment along the flight path 160, the component controller 155 may invoke or use the command model 145 of the control unit 120. The command model 145 may configure, adjust, or otherwise modify the set of commands in accordance with a performance constraint 205A-N (hereinafter generally referred to as performance constraint 205) of the air vehicle 105. Each performance constraint 205 may be related to a capability, an operability, or maneuverability of the overall air vehicle 105. In some embodiments, the performance constraints 205 may be carried from or provided by the fault detector 150 in response to a detection of a fault.

The performance constraint may include, for example: a maximum rate along a pitch axis, roll axis, or yaw axis relative to the air vehicle 105, a minimum rate and bandwidth along the pitch axis, roll axis, or yaw axis relative to the air vehicle 105, a bandwidth along the pitch axis, roll axis, or yaw axis, a maximum speed or the roll, pitch, or vertical propulsion of the air vehicle 105, a minimum speed for the roll, pitch, or vertical propulsion, and a speed bandwidth for the roll, pitch, or vertical propulsion, among others. The maximum rate may define the greatest value for the rate at which the air vehicle 105 can rotate about the respective axis (e.g., pitch, roll, or yaw). The minimum rate may define the lowest value for the rate at which the air vehicle 105 can rotate about the respective axis (e.g., pitch, roll, or yaw). The maximum bandwidth may define the range of values between the minimum and maximum rate at which the air vehicle 105 can rotate about the respective axis. The maximum speed may define the greatest value for the speed at which the air vehicle 105 can propel itself through the environment along the respective axis (e.g., vertical or horizontal). The speed bandwidth may define a range of values between minimum and maximum speed at which the air vehicle 105 can travel along the axis.

As the air vehicle 105 navigates through the environment, the fault detector 150 of the control unit 120 may monitor for faults among the components 125 in the air vehicle 105. The fault may be with the structure (e.g., hull, fuselage, cockpit, or windows), propulsion system (e.g., landing gear, fuel tank, batteries, engine, rotor, wing, and tail), or sensor instrumentation, among others. In some embodiments, the fault detector 150 may transmit, convey, or send a request for status to each component 125 in the air vehicle 105 in monitoring. In response to the request, the recipient component 125 can send, return, or otherwise provide a response indicating the status of the component 125 to the fault detector 150. The response may identify whether the respective component 125 is properly operating or otherwise has a fault. In some embodiments, the fault detector 150 may receive the indication of the fault from the respective component 125 upon detection of the fault at the component 125. Upon detection of the fault, the fault detector 150 may determine, find, or otherwise identify one or more component 125 associated with the fault. For example, the fault detector 150 may receive an indication from the rudder controller (an example of a component 125) that the rudder connected thereto is malfunctioning, and determine that the rudder has a fault.

Upon detection of the fault, the command model 145 may calculate, identify, or otherwise determine a change to at least one of the performance constraints 205. The performance constraints 205 may dependent on the independent capabilities or performance of the individual components 125 in the air vehicle 105. The fault on any of the component 125 in the air vehicle 105 as a result may degrade, reduce, or otherwise impact at least one of the performance constraints 205. In some embodiments, the command model 145 may also identify one or more components 125 associated with the fault in determining the change to the performance constraints. In some embodiments, upon detection of the fault, the fault detector 150 may provide the performance constraints 205 as part of updated parameters 220 to provide to the command model 145 and the path executor 115. The updated parameters 220 may be used by the command model 145 to adjust the set of commands.

To determine the change in the performance constraint 205, the command model 145 may use a table of performance constraints in view of detected faults. The table may be maintained using at least one data structure, such as a table, an array, a matrix, a linked list, a tree, a graph, and a heap, among others. The table may define or correspond or map a fault in an identified component 125 to a value of respective performance constraint 205, such a maximum rate along a pitch axis, roll axis, or yaw axis relative to the air vehicle 105, a minimum rate and bandwidth along the pitch axis, roll axis, or yaw axis relative to the air vehicle 105, a bandwidth along the pitch axis, roll axis, or yaw axis, a maximum speed or the roll, pitch, or vertical propulsion of the air vehicle 105, a minimum speed for the roll, pitch, or vertical propulsion, and a speed bandwidth for the roll, pitch, or vertical propulsion, among others. For instance, the table may define that a malfunction in the rudder on the vertical stabilizer results in a new reduced value for the yaw rate bandwidth. The table may also specify that a faulty aileron on a right wing results in a new reduced maximum roll rate.

From the table, the command model 145 may identify the change to the performance constraint 205 to each identified fault from the components 125 of the air vehicle 105. For example, the command model 145 may identify the previous value of the performance constraint 205 and the value identified by the table for the performance constraint 205 with the detected fault. Using the previous value and the value defined by the table, the command model 145 may calculate the change in the performance constraint 205. In some embodiments, the command model 145 may use the change in performance constraints 205 to reconfigure or adjust the set of commands to be applied to the components 125 via the component controller 155. For example, the command model 145 may use the change in performance constraints 205 to adjust or redistribute the set of commands to other components 125 without any detected faults. The adjustment may be applied until provision of a new set of commands from the path executor 115. With the determination of the change to the performance constraints 205, the command model 145 may send, convey, or otherwise provide an indication of the change in the performance constraint 205 to the path executor 115.

The motion planner 130 of the path executor 115 may retrieve, identify, or receive the indication of the change to the performance constraint 205 from the control unit 125. The indication may identify a reduction or degradation of at least one of the performance constraints 205 in the air vehicle 105 due to a fault with one or more of the components 125 therein. With receipt, the motion planner 130 may determine whether the air vehicle 105 is able to execute the previous set of commands to control the movement of the air vehicle 105 along the trajectory. The determination may be based on the change to the performance constraint 205 from the control unit 120. The prior set of commands may be to navigate the air vehicle 105 along the trajectory based on the previous or default performance constraints 205 of the air vehicle 105. The trajectory associated with the prior set of commands may define a requirement for the set of performance constraints as discussed above.

To determine whether the air vehicle 105 is able to execute the prior set of commands, the motion planner 130 may compare the degradation in the performance constraint 205 to the requirement for each of the previously generated trajectories for the flight path 160. When the performance constraint 205 exhibiting degradation is determined to satisfy all the requirements for the trajectory, the motion planner 130 may determine that the air vehicle 105 is able to execute the set of commands for the trajectory. With that determination, the trajectory planner 135 may continue to with the previously generated trajectory and provide the set of commands in accordance with the trajectory to the control unit 120. For example, the motion planner 130 may determine that the maximum roll rate as identified in the performance constraint 205 with the degradation is greater than the minimum roll rate specified by the requirement of the trajectory. With this determination, the trajectory planner 135 may continue with the next set of commands in the trajectory.

On the other hand, when the performance constraint 205 exhibiting degradation is determined to not satisfy at least one requirement for the trajectory, the motion planner 130 may determine that the air vehicle 105 is unable to execute the set of commands for the trajectory. With that determination, the trajectory predictor 135 may generate one or more new trajectories for the flight path 160. The generation of the new trajectories may be based on environmental data 210, a route 215, or the degradation in the performance constraint 205, among others. The environmental data 210 may include various characteristics about the environment or terrain through which the air vehicle 105 is navigating as discussed above. The route 215 may be defined by the flight path 160 along which the air vehicle 105 is to navigate from the initial point through one or more waypoints to the terminal point.

In generating the one or more new trajectories, the trajectory predictor 135 may determine or generate a modified set of commands to control navigation of the air vehicle 105 along at least one of the new trajectories. The modified set of commands may be those that the air vehicle 105 is capable of executing based on the degradation in the performance constraint 205. The generation of the modified set of commands may be similar to the generation of previous instance of the set of commands as described above. In some embodiments, at least some of the previously generated trajectories may be included as part of the new trajectories. For example, the trajectory predictor 135 may generate a different set of commands to guide the air vehicle 105 along the same trajectory. In some embodiments, one or more of the new trajectories may differ from the previously generated trajectories. For instance, the trajectory predictor 135 may generate the modified set of commands to navigate the air vehicle 105 along a trajectory different from the previously set trajectory. With the generation, the trajectory predictor 135 may send, convey, or provide the modified set of commands to the control unit 120. The provision of the set of commands via the trajectory follower 140.

In some embodiments, the trajectory predictor 135 may identify or determine which commands the air vehicle 105 is capable of performing based on the degradation in performance constraint 205. The determination may be in conjunction with the generation of the modified set of commands. In determining, the trajectory predictor 135 may use the table of commands maintained on the data storage of the air vehicle 105. As discussed above, the table of commands may specify the parameter of the trajectory (e.g., velocity and angle along axes) to a corresponding set of commands. For each of the commands for executing the trajectory, the trajectory predictor 135 may compare the parameter of the trajectory to the degradation in performance constraint 205. When the parameter does not satisfy (e.g., outside the range) the performance constraint 205 with the degradation, the trajectory predictor 135 may determine that the air vehicle 105 is incapable of performing the command corresponding to the parameter for the trajectory. In contrast, when the parameter satisfies (e.g., is within the range) the performance constraint 205 exhibiting the degradation, the trajectory predictor 135 may determine that the air vehicle 105 is capable of performing the command corresponding to the parameter.

Based on the determinations of which commands the air vehicle 105 is capable of performing to account for the degradation in the performance constraint 205, the trajectory predictor 135 may determine whether the air vehicle 105 is capable of performing the trajectory. If all of the commands for the trajectory are determined to be capable of being performed by the air vehicle 105, the trajectory predictor 135 may determine that the air vehicle 105 is capable of performing the trajectory. In addition, the trajectory predictor 135 may identify or select the trajectory to include as the one or more potential trajectories to control movement of the air vehicle 105 for the flight path 160. Otherwise, if at least one of the commands for the trajectory are determined to be incapable of performance, the trajectory predictor 135 may determine that the air vehicle 105 is incapable of performing the trajectory. The trajectory predictor 135 may also identify the trajectory as excluded from the one or more new potential trajectories. The trajectory predictor 135 may perform similar determination over all the new and previously generated trajectories for the flight path 160.

In some embodiments, the trajectory predictor 135 may determine whether the air vehicle 105 is unable to carry out the flight path 160 due to the degradation of the performance constraint 205. The determination of whether the air vehicle 105 is unable to carry out may correspond to a determination of whether the air vehicle 105 is unable to reach the destination point of the flight plan 160. The determination may be dependent or based on the determination of whether the air vehicle 105 is capable of performing the trajectories for the flight path 160, including the previously generated and newly generated trajectories. If at least one of the trajectories is determined to be capable of performance by the air vehicle 105, the trajectory predictor 135 may determine that the air vehicle 105 is able to carry out the flight path 160, and may determine to continue with the flight path 160. With the determination, the trajectory predictor 135 may send, convey, provide the modified set of commands for the flight path 160 to the control unit 120. The provision of the set of commands via the trajectory follower 140.

Conversely, if none of the trajectories for the flight path 160 are determined to be capable of performance of the air vehicle 105, the trajectory predictor 135 may determine that the air vehicle 105 is not capable of performing the flight path 160. The trajectory predictor 135 may also determine that the air vehicle 105 is unable to reach the destination point originally defined by the flight path 160. When the air vehicle 105 is determined to be unable to perform the flight path 160, the trajectory predictor 135 may also invoke the mission planner 110 to generate a new flight path. In invoking, the trajectory predictor 135 may provide an indication that the air vehicle 105 is unable of performing the flight path 160. In some embodiments, the trajectory predictor 135 may provide an indication that the air vehicle 105 is unable to reach the destination point defined by the flight path 160 to the mission planner 110.

Upon invocation, the mission planner 110 may generate or determine a new flight path. The new flight path may identify or include a new destination point and one or more waypoints between the current position of the air vehicle 105 and the new destination point. The new flight path may be, for example, a contingent flight path to navigate the air vehicle 105 to a safe landing zone as a precautionary measure. In some embodiments, the mission planner 110 may identify the new flight path as defined as a contingency plan for the original flight path 160. In some embodiments, the mission planner 110 may use the environmental data 210 to identify or determine the new destination point for the air vehicle 105. The mission planner 110 may also make use of the world model as described above. The new destination point may correspond to the safe landing zone for the air vehicle 105 such as over water, an unpopulated inland terrain, or the nearest maintenance facility, among others. With the identification, the mission planner 110 may determine or generate the one or more waypoints and the new flight path from the current point of the air vehicle 105 to the new destination point. The mission planner 110 may send, convey, or provide the new flight path to the path executor 115.

To carry out the new flight path, the trajectory predictor 135 of the motion planner 130 may determine or generate one or more new trajectories along which to navigate the air vehicle 105. In some embodiments, the trajectory predictor 135 may generate the trajectories upon receipt of the performance constraints 205 from the command model 145. The generation of the new trajectories for the new flight path may be similar to the generation of trajectories as discussed above. For instance, the generation of the new trajectories for the new flight path may take into account the degradation of the performance constraint 205. Each trajectory may correspond to a route between the current position and the safe landing zones through each of the consecutive waypoints of the new flight path. Upon generation, the motion planner 130 may identify or select at least one of the trajectories based on environmental data. The selection of the trajectory may be performed as discussed above, in terms of dynamic feasibility, clearance to obstacles, and overall length and time, among others. With the selection of the new trajectories, the trajectory predictor 135 may generate the set of commands that are determined to be capable of performance by the air vehicle 105 due to the degradation in the performance constraint 205. With the generation, the trajectory predictor 135 may send, convey, or provide the set of commands for the new trajectory to the control unit 120. The provision may be via the trajectory follower 140.

In some embodiments, the trajectory predictor 135 may identify or select a trajectory from the one or more new trajectories determined in response to the receipt of the indication of the degradation in the performance constraint 205. The selection may be from the trajectories identified as to be included in the potential one or more trajectories based on the degradation of the in the performance constraint 205 as discussed above. The selected trajectory may be to control the navigation of the air vehicle 105 for the flight path 160 (or the new flight path). From the one or more new trajectories, the trajectory predictor 135 may use the environmental data 210 to identify the most optimal trajectory for the environment through which the air vehicle 105 is navigating. With the selection, the trajectory predictor 135 may send, convey, or provide the set of commands for the selected trajectory to the control unit 120. The provision may be via the trajectory follower 140.

In some embodiments, the trajectory predictor 135 may provide a prompt to select from the one or more new trajectories for presentation. The prompt may be rendered or presented to the operator of the air vehicle 105 for selecting one of the trajectories. The prompt may be displayed to the pilot within a cockpit of the air vehicle 105 or rendered on a remote terminal to the operator of the air vehicle 105. The prompt may include one or more elements (e.g., graphical user interface elements) for the new trajectories. From the elements of the prompt, the operator may select one of the trajectories. Upon detection of interaction with one of the elements, the trajectory predictor 135 may identify the corresponding trajectory. The trajectory predictor 135 may send, convey, or provide the set of commands for the selected trajectory to the control unit 120. The provision may be via the trajectory follower 140.

In providing the modified set of commands, the trajectory follower 140 may set, adjust, or otherwise change the modified set of commands based on one or more vehicle states 225 of the air vehicle 105. The vehicle states 225 may include, for example, a geographic position, an orientation (along a pitch, roll, or yaw axis), an altitude, a speed, a velocity, an acceleration, a fuel amount, or a weight, among others of the air vehicle 105. The trajectory follower 140 may retrieve, receive, or identify the vehicle states 225 from the instrumentation (e.g., included in the components 125) of the air vehicle 105. Using the vehicle state 225, the trajectory follower 140 may set, adjust, or further modify the modified set of commands. For instance, based on a decreased weight of the air vehicle 105, the trajectory follower 140 may decrease a power of engine output to account for the decrease weight. With the adjustment, the trajectory follower 140 may send, convey, or provide the set of commands for the new trajectory to the control unit 120.

The component controller 155 of the control unit 120 may in turn retrieve, identify, or otherwise receive the modified set of commands generated by the path executor 115. The modified set of commands may take into account the degradation of the performance constraint 205 of the air vehicle 105. Upon receipt, the component controller 155 may apply the set of commands to the corresponding components 125 in the air vehicle 105 to carry out the trajectory for the flight path 160 (or new flight path). The application of the commands may be as described above. In addition, as additional faults are detected on the air vehicle 105, the processes discussed above may be repeated.

In this manner, the indications of degradation in performance constraints 205 may be used to refine and update the trajectories and command sets generated by the trajectory predictor 135. The generation of the trajectories of the command sets may be performed without manual reconfiguration of the path executor 115 or the motion planner 130 in the air vehicle 105. Using the modified set of commands, the control unit 120 may control the air vehicle 105 to navigate through the environment within the confines of the degradation to performance constraints 205.

Figure 3:
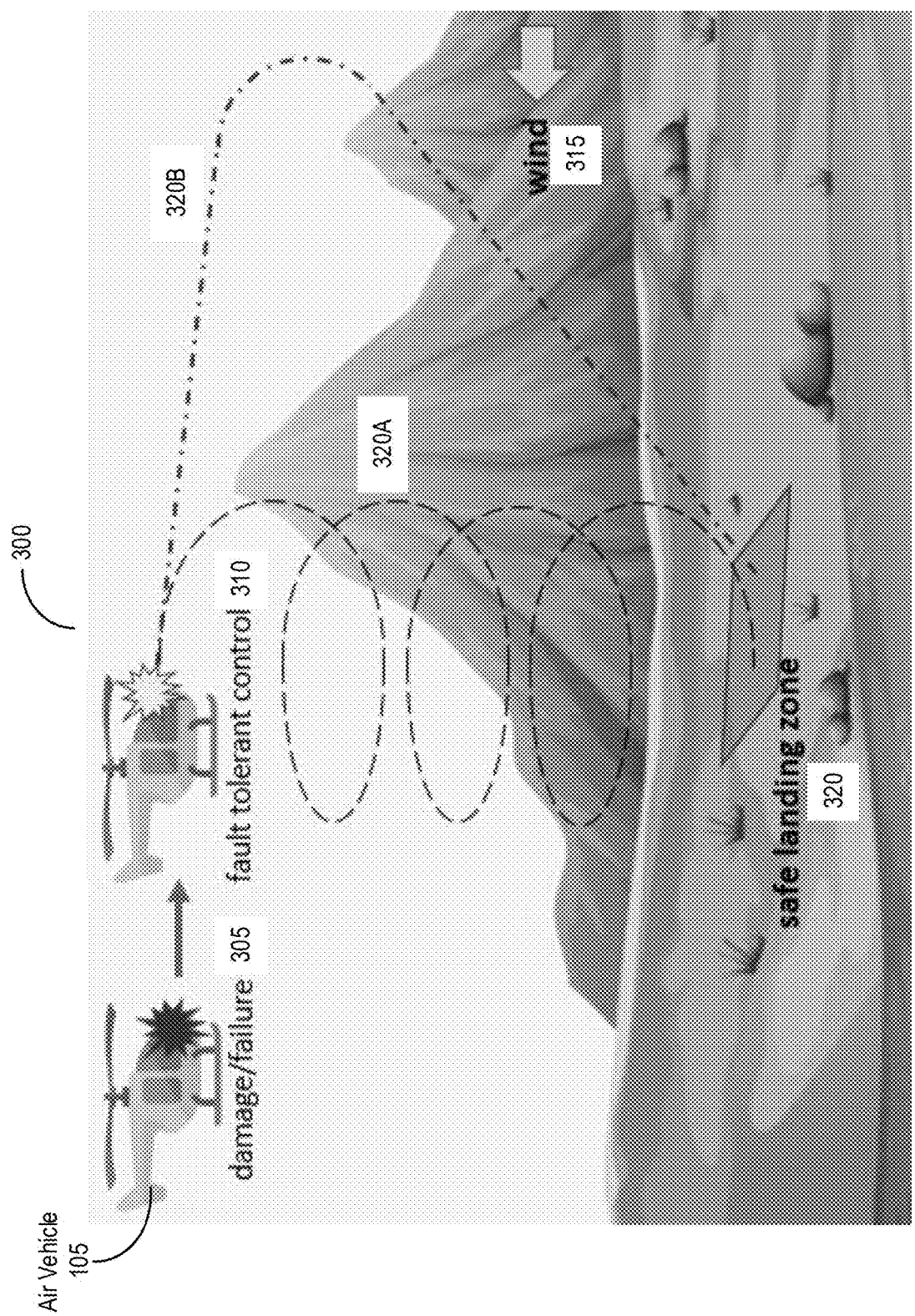
FIG. 3 illustrates a block diagram of a process for changing trajectory in response to detection of a fault in a vehicle in the system for handling faults, in accordance with an illustrative embodiment.

Referring to FIG. 3, among others, depicted is a block diagram of a process 300 for changing trajectory in response to detection of a fault in the air vehicle 105 in the system 100 for handling faults. Under the process 300, as the air vehicle 105 flies through the environment, the fault detector 150 of the control unit 120 may detect damage of failure to one or more of the components 125 (305). The failure may result in a degradation to the performance constraint 205 of the air vehicle 105. With the detection of the failure, the control unit 120 may trigger fault-tolerant control and may provide the indication of the degradation in the performance constraint 205 to the path executor 115 (310). Under the fault-tolerant control procedures, the trajectory predictor 135 may determine whether the air vehicle 105 is unable to reach the original destination point (e.g., a safe landing zone 320) along the original path 320A. The determination may factor in the degradation to the performance constraint 205. In the depicted scenario, the trajectory predictor 135 may determine that the air vehicle 105 is incapable of reaching the safe landing zone 320 along the original path 320A of the initial flight plan 160.

With this determination, the motion planner 130 may retrieve environmental data regarding the environment and terrain through which the air vehicle 105 is flying. The environmental data may identify that the air vehicle 105 is flying through a mountainous terrain and is traveling against the direction of the wind 315. Using the environmental data, the trajectory predictor 135 in the motion planner 130 in turn may generate a new trajectory 320B in accordance with the to guide the air vehicle 105 to the safe landing zone 320. The motion planner 130 may select the trajectory 320B. In turn, the trajectory follower 140 may generate and provide the set of commands to the control unit 120 to control navigation of the air vehicle 105 along the new trajectory 320B.

Figure 4:
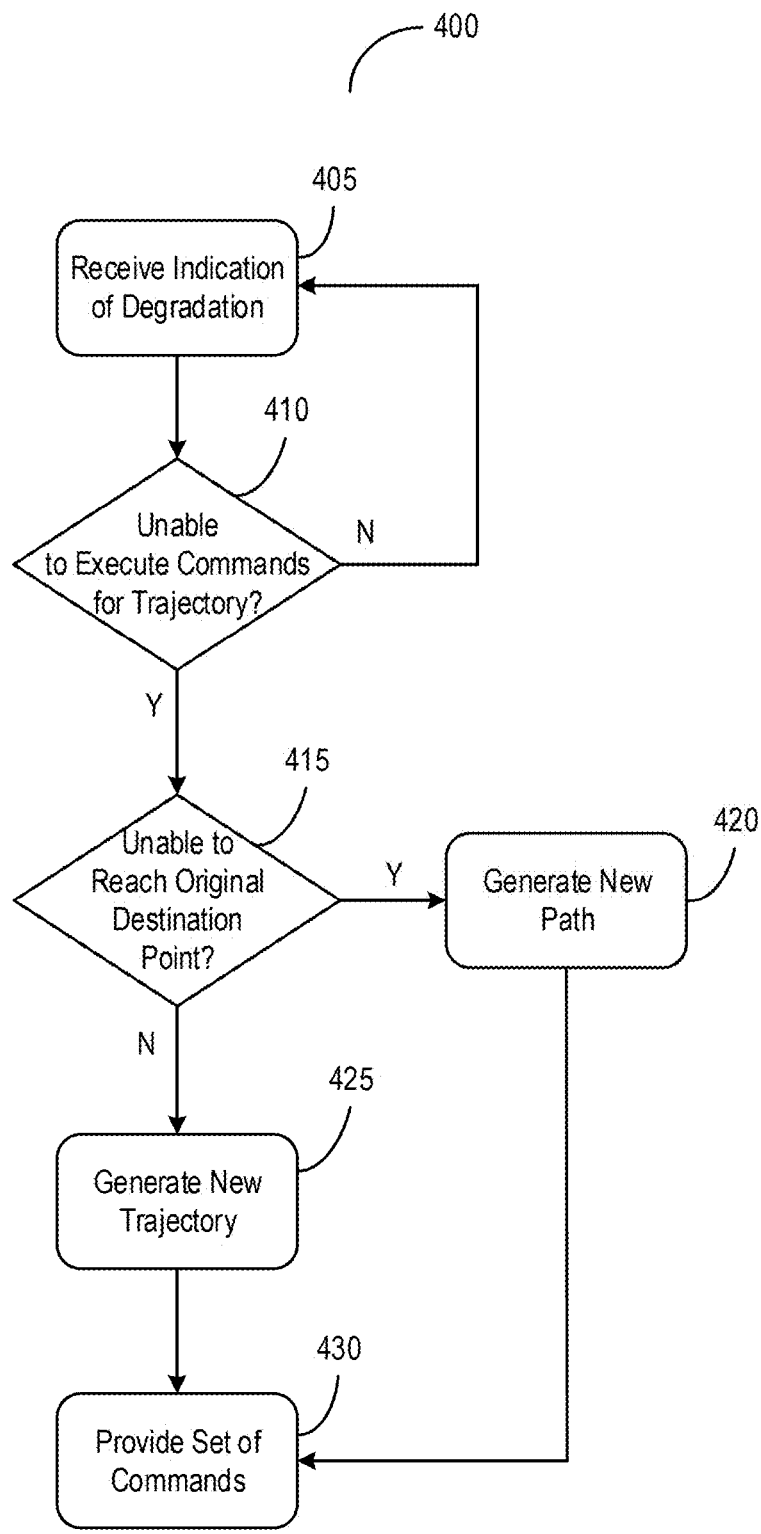
FIG. 4 illustrates a flow diagram of a method of handling faults on vehicles, in accordance with an illustrative embodiment.

Referring to FIG. 4, among others, depicted is a flow diagram of a method 400 of handling faults on vehicles. The method 400 may be performed by or implemented using any of the components detailed above with respect to FIGS. 1 and 2 or with the components described in FIG. 6. In overview, a computing system may receive an indication of a degradation (405). The computing system can determine whether a vehicle is unable to execute commands for a path (410). If the vehicle is determined to be unable to execute commands, the computing system may determine whether the vehicle is unable to reach an original destination point (415). If the vehicle is determined to be unable to reach the destination point, the computing system may generate a new path (420). If the vehicle is determined to be able to reach the destination point, the computing system may generate a new trajectory (425). The computing system can provide a set of commands (430).

In further detail, a computing system (e.g., the path executor 115) may receive an indication of a degradation (405). The degradation may identify a reduction to one or more performance constraints (e.g., the performance constraint 205) of a vehicle (e.g., the air vehicle 105). The computing system may receive the indication of the degradation from a control unit in the vehicle, upon detection of a fault in at least one component (e.g., the components 125). The control unit may apply commands to configure various components to control navigation of the vehicle through the environment. The performance constraint may identify, for example, a maximum rate and bandwidth along a pitch axis, a roll axis, or a yaw axis and a maximum speed and speed bandwidth for the horizontal or vertical propulsion of the vehicle.

The computing system can determine whether the vehicle is unable to execute commands for a trajectory (e.g., at least one of the trajectories for the flight path 160) (410). The determination may factor into the degradation to the performance constraint of the vehicle. The commands may have been previously generated to guide the vehicle along a trajectory for the path. To determine, the computing system may compare the performance constraint in view of the degradation with the performance requirements for the trajectory. When the performance constraint with the degradation satisfies the requirements, the computing system may determine that the vehicle is able execute the commands and may continue along the trajectory. Otherwise, when the performance constraint with the degradation does not satisfy the requirements, the computing system may determine that the vehicle is unable to execute the commands.

If the vehicle is determined to be unable to execute commands, the computing system may determine whether vehicle is unable to reach an original destination point of the flight path (415). The computing system may check whether the vehicle is unable to carry out all the trajectories for the flight path in view of the degradation to the performance constraint of the vehicle. The check may be based on a comparison between the performance constraint with the degradation against the performance requirements specified by each trajectory. When the vehicle is determined to be able to carry out at least one of the trajectories, the computing system may determine that the vehicle is able to reach the destination point of the flight path. Conversely, when the vehicle is determined to be unable to carry out all of the trajectories for the flight path, the computing system may determine that the vehicle is unable to reach the destination point.

If the vehicle is determined to be unable to reach the destination point, the computing system may generate a new path (420). The computing system may generate the new path to a new destination. The new path may be a contingency path to navigate the vehicle to a safe landing zone (e.g., the safe landing zone 305) as a precautionary measure for the vehicle. With the invocation, the computing system may retrieve environmental data (e.g., the environmental data 210). The environmental data may identify various characteristics about the environment or terrain through which the vehicle is navigation. Using the environmental data, the computing system may identify a new destination point for the new path. The computing system may also generate a new trajectory in accordance with the new flight path.

On the other hand, if the vehicle is determined to be able to reach the destination point, the computing system may generate a new trajectory (425). The generation of the trajectory may factor in the degradation in the performance constraint of the vehicle. In generating, the computing system may identify one or more trajectories for the original flight path that the vehicle is determined to be capable of carrying out. With the generation, the computing system may select one of the trajectories for the air vehicle to follow. The selected trajectory may be in terms of dynamic feasibility, clearance to obstacles, and overall length and time, among others.

The computing system can provide a set of commands (430). With the generation and selection of the trajectory (along the original or new path), the computing system may generate the set of commands to navigate the air vehicle along the trajectory. The computing system may provide the set of commands to the control unit. The control unit in turn may apply the values identified in commands to the components of the vehicle to effectuate the trajectory indicated by the modified set of commands. The vehicle may thus operate within the confines to the performance constraint due to the fault in one or more of the components.

Figure 5:
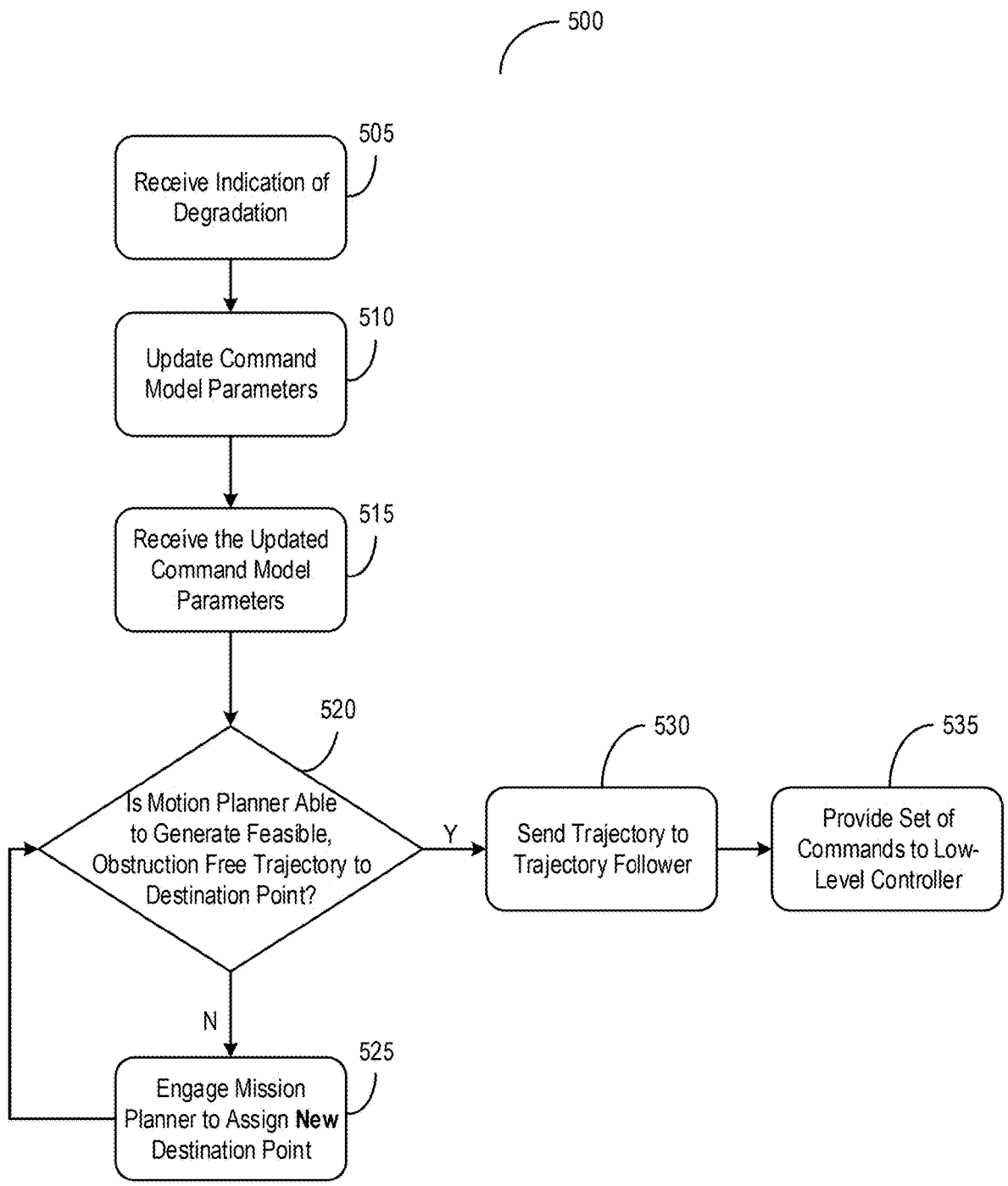
FIG. 5 illustrates a flow diagram of a method of handling degradations on vehicles, in accordance with an illustrative embodiment.

Referring to FIG. 5, among others, depicted is a flow diagram of a method 500 of handling faults on vehicles. The method 500 may be performed by or implemented using any of the components detailed above with respect to FIGS. 1 and 2 or with the components described in FIG. 6. As depicted, a fault detector in a control unit may receive an indication of degradation (505). The fault detector may use the indication of the degradation to update command model parameter in the command model of the control unit (510). The path executor in turn may receive the updated command model parameters (515). The motion planner of the path executor may determine whether the motion planner is able to generate a feasible, obstruction free trajectory to a destination point (520). When the determination is that the generation of such a trajectory is not feasible, the motion planner may engage the mission planner to assign a new destination point (525). Otherwise, when the determination is that the generation of the trajectory is feasible, the motion planner may send the trajectory to the trajectory follower (530). The trajectory follower may provide the set of commands to the low-level controller (535).

Referring to FIG. 6, depicted is a block diagram of an example computer system 600. The computer system or computing device 600 can include or be used to implement the system 100, or its components such as the motion planner 110, the path executor 115 (including the motion planner 130, the trajectory follower 135, and the trajectory predictor 140), the control unit 120 (including the command model 145, the fault detector 150, and the component controller 155), among others. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as an administrator of the data processing system. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of a component of FIG. 1.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A system for handling faults on aircraft, comprising:
one or more processors coupled with memory housed in an aircraft, the one or more processors configured to:
receive, from a control unit in response to a detection of a fault in the aircraft, an indication of an amount of degradation in a bandwidth of a performance constraint of the aircraft;
determine, responsive to the amount of the degradation in the bandwidth of the performance constraint, that the aircraft is unable to execute a set of commands to control a movement of the aircraft to autonomously navigate along an initial trajectory to a destination without using user input;
generate a plurality of candidate trajectories to replace the initial trajectory by inputting the amount of degradation in the bandwidth of the performance constraint to a first control algorithm, the plurality of candidate trajectories comprising a plurality of commands that autonomously navigate the aircraft along the plurality of candidate trajectories without using the user input;
filter the plurality of candidate trajectories to identify a plurality of replacement trajectories having destinations located within a predefined radius about the destination of the initial trajectory;
select a replacement trajectory from the plurality of replacement trajectories based on a comparison of the plurality of commands against the degraded bandwidth of the performance constraint indicating that the replacement trajectory includes commands within the degraded bandwidth;
generate at least one parameter for a filter of a second control algorithm based on the amount of the degradation;
input the replacement trajectory to a second control algorithm to:
generate, in accordance with the amount of the degradation in the bandwidth of the performance constraint, a modified set of commands that the aircraft is able to execute to autonomously control the movement of the aircraft along the replacement trajectory without using the user input; and
filter the modified set of commands using the filter configured with the at least one parameter; and
control, via the control unit, the movement of the aircraft in accordance with the filtered set of commands to autonomously navigate the aircraft along the replacement trajectory without using the user input.

2. The system of claim 1, wherein the one or more processors are further configured to determine, responsive to the amount of the degradation in the bandwidth of the performance constraint not satisfying a requirement for a speed along a vertical axis of the aircraft defined by the initial trajectory, that the aircraft is unable to execute the set of commands to control the aircraft along the initial trajectory.

3. The system of claim 1, wherein the one or more processors are further configured to generate the modified set of commands based on a state of the aircraft, the state including at least one of a position, an orientation, or a speed of the aircraft.

4. The system of claim 1, wherein the one or more processors are further configured to:
determine, responsive to the amount of the degradation in the bandwidth of the performance constraint, that the aircraft is unable to reach the destination on the initial trajectory due to the amount of the degradation of the performance constraint; and
provide an indication that the aircraft is unable to reach the destination on the initial trajectory to a mission planner, the mission planner to determine the replacement trajectory to the destination based on environment data, the environment data identifying at least one of an obstacle or a terrain in an environment in which the aircraft is navigating.

5. The system of claim 1, wherein the one or more processors are further configured to determine the plurality of commands capable to be performed on the aircraft based on the amount of the degradation in the bandwidth of the performance constraint.

6. The system of claim 1, wherein the one or more processors are further configured to provide, for presentation, a prompt to select the replacement trajectory from the plurality of candidate trajectories along which to navigate the aircraft.

7. The system of claim 1, wherein the degradation in the bandwidth of the performance constraint includes at least one of a minimum roll rate, a maximum roll rate, a roll bandwidth, a minimum pitch rate, a maximum pitch rate, a pitch bandwidth, a maximum yaw rate, a yaw bandwidth, a maximum vertical speed, a maximum roll acceleration, a maximum pitch acceleration, or a vertical speed bandwidth.

8. The system of claim 1, wherein the control unit is configured to identify, using the fault detected on the aircraft, the amount of the degradation in the bandwidth of the performance constraint.

9. The system of claim 1, wherein the one or more processors are further configured to:
adjust at least one response characteristic of the filter using the at least one parameter; and
filter the modified set of commands using the adjusted response characteristic of the filter.

10. A method of handling faults on aircraft, comprising:
receiving, by one or more processors housed in the aircraft, from a control unit in response to a detection of a fault in the aircraft, an indication of an amount of degradation in a bandwidth of a performance constraint of the aircraft;
determining, by the one or more processors, responsive to the amount of the degradation in the bandwidth of the performance constraint, that the aircraft is unable to execute a set of commands to control a movement of the aircraft to autonomously navigate along an initial trajectory to a destination without using user input;
generating, by the one or more processors, a plurality of candidate trajectories to replace the initial trajectory by inputting the amount of degradation in the bandwidth of the performance constraint to a first control algorithm, the plurality of candidate trajectories comprising a plurality of commands that autonomously navigate the aircraft along the plurality of candidate trajectories without using the user input;
filter the plurality of candidate trajectories to identify a plurality of replacement trajectories having destinations located within a predefined radius about the destination of the initial trajectory;
selecting, by the one or more processors, a replacement trajectory from the plurality of replacement trajectories based on a comparison of the plurality of commands against the degraded bandwidth of the performance constraint indicating that the replacement trajectory includes commands within the degraded bandwidth;
generating, by the one or more processors, at least one parameter for a filter of a second control algorithm based on the amount of the degradation;
inputting, by the one or more processors, the replacement trajectory to a second control algorithm to:
generate, in accordance with the amount of the degradation in the bandwidth of the performance constraint, a modified set of commands that the aircraft is able to execute to autonomously control the movement of the aircraft along the replacement trajectory without using the user input; and
filter the modified set of commands using the filter configured with the at least one parameter; and
controlling, by the one or more processors via the control unit, the movement of the aircraft in accordance with the filtered set of commands to autonomously navigate the aircraft along the replacement trajectory without using the user input.

11. The method of claim 10, wherein determining further comprises determining, responsive to the amount of the degradation in the bandwidth of the performance constraint not satisfying a requirement for a speed along a vertical axis of the aircraft defined by the initial trajectory, that the aircraft is unable to execute the set of commands to control the aircraft along the initial trajectory.

12. The method of claim 10, wherein generating further comprises generating the modified set of commands based on a state of the aircraft, the state including at least one of a position, an orientation, and a speed of the aircraft.

13. The method of claim 10, wherein determining further comprises determining, responsive to the amount of the degradation in the bandwidth of the performance constraint, that the aircraft is unable to reach the destination on the initial trajectory due to the amount of the degradation of the performance constraint; and
further comprising providing, by the one or more processors, an indication that the aircraft is unable to reach the destination on the initial trajectory to a mission planner, the mission planner to determine the replacement trajectory to the destination based on environment data, the environment data identifying at least one of an obstacle or a terrain in an environment in which the aircraft is navigating.

14. The method of claim 10, further comprising determining, by the one or more processors, the plurality of commands capable to be performed on the aircraft based on the amount of the degradation in the bandwidth of the performance constraint.

15. The method of claim 10, wherein providing, by the one or more processors, for presentation, a prompt to select the replacement trajectory from the plurality of candidate trajectories along which to navigate the aircraft.

16. An aircraft, comprising:
one or more processors coupled with memory, the one or more processors configured to:
receive, from a control unit in response to a detection of a fault in the aircraft, an indication of an amount of degradation in a bandwidth of a performance constraint of the aircraft;
determine, responsive to the amount of the degradation in the bandwidth of the performance constraint, that the aircraft is unable to execute a set of commands to control a movement of the aircraft to autonomously navigate along an initial trajectory to a destination;
generate a plurality of candidate trajectories to replace the initial trajectory by inputting the amount of degradation in the bandwidth of the performance constraint to a first control algorithm, the plurality of candidate trajectories comprising a plurality of commands that autonomously navigate the aircraft along the plurality of candidate trajectories without using the user input;
filter the plurality of candidate trajectories to identify a plurality of replacement trajectories having destinations located within a predefined radius about the destination of the initial trajectory;
select a replacement trajectory from the plurality of replacement trajectories based on a comparison of the plurality of commands against the degraded bandwidth of the performance constraint indicating that the replacement trajectory includes commands within the degraded bandwidth;

generate at least one parameter for a filter of a second control algorithm based on the amount of the degradation;

input the replacement trajectory to a second control algorithm to:
  generate, in accordance with the amount of the degradation in the bandwidth of the performance constraint, a modified set of commands that the aircraft is able to execute to autonomously control the movement of the aircraft along the replacement trajectory without using the user input; and
  filter the modified set of commands using the filter configured with the at least one parameter; and
  control, via the control unit, the movement of the aircraft in accordance with the filtered set of commands to autonomously navigate the aircraft along the replacement trajectory without using the user input.

17. The aircraft of claim 16, wherein the one or more processors are further configured to determine, responsive to the amount of the degradation in the bandwidth of the performance constraint not satisfying a requirement for a speed along a vertical axis of the aircraft defined by the initial trajectory, that the aircraft is unable to execute the set of commands to control the aircraft along the initial trajectory.

\* \* \* \* \*